(12) United States Patent
Pope et al.

(10) Patent No.: US 10,753,368 B2
(45) Date of Patent: Aug. 25, 2020

(54) MULTI-PIECE NON-LINEAR AIRFOIL

(71) Applicant: UNITED TECHNOLOGIES CORPORATION, Farmington, CT (US)

(72) Inventors: Andrew Pope, Glendale, NY (US); Peter V. Tomeo, Middletown, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 644 days.

(21) Appl. No.: 15/245,137

(22) Filed: Aug. 23, 2016

(65) Prior Publication Data
US 2018/0058469 A1    Mar. 1, 2018

(51) Int. Cl.
| F04D 29/38 | (2006.01) |
| F01D 5/30 | (2006.01) |
| F02C 3/04 | (2006.01) |
| F02K 3/06 | (2006.01) |
| F04D 19/00 | (2006.01) |

(Continued)

(52) U.S. Cl.
CPC ......... *F04D 29/388* (2013.01); *F01D 5/3084* (2013.01); *F02C 3/04* (2013.01); *F02K 3/06* (2013.01); *F04D 19/002* (2013.01); *F04D 29/325* (2013.01); *F04D 29/34* (2013.01); *F04D 29/384* (2013.01); *F05B 2220/302* (2013.01); *F05B 2260/30* (2013.01); *F05B 2280/10304* (2013.01); *F05B 2280/2006* (2013.01); *F05B 2280/6003* (2013.01); *F05D 2220/32* (2013.01); *F05D 2220/36* (2013.01); *F05D 2300/133* (2013.01); *F05D 2300/603* (2013.01); *Y02T 50/672* (2013.01)

(58) Field of Classification Search
CPC . F01D 5/3084; F02C 3/04; F02K 3/06; F04D 19/002; F04D 29/325; F04D 29/34; F04D 29/384; F04D 29/388; F05B 2220/302; F05B 2260/30; F05B 2280/10304; F05B 2280/2006; F05B 2280/6003; F05D 2220/32; F05D 2220/36; F05D 2300/133; F05D 2300/603; Y02T 50/672
See application file for complete search history.

(56) References Cited

U.S. PATENT DOCUMENTS 3,132,841 A * 5/1964 Wilder, Jr. ............. F01D 5/282
                                                                416/219 R
3,801,222 A * 4/1974 Violette ................ F01D 5/3007
                                                                416/220 R (Continued)

FOREIGN PATENT DOCUMENTS

| EP | 1085172 A2 | 3/2001 |
| EP | 2077376 A2 | 7/2009 |

(Continued)

OTHER PUBLICATIONS

European Search Report for European Application No. 17187342.5 dated Jan. 2, 2018, 9 pages.

*Primary Examiner* — Jesse S Bogue
(74) *Attorney, Agent, or Firm* — Cantor Colburn LLP (57) ABSTRACT

A fan blade assembly for a gas turbine engine is provided. The fan blade assembly having: a non-linear composite airfoil; and a metal root removably attached to the non-linear composite airfoil.

6 Claims, 5 Drawing Sheets

(51) Int. Cl.
*F04D 29/32* (2006.01)
*F04D 29/34* (2006.01)

(56) References Cited

U.S. PATENT DOCUMENTS

| | | | | |
|---|---|---|---|---|
| 4,207,029 A * | 6/1980 | Ivanko | ................... | F01D 5/3084 |
| | | | | 416/220 R |
| 4,343,593 A | 8/1982 | Harris | | |
| 4,790,723 A * | 12/1988 | Wilson | ................... | F01D 5/3092 |
| | | | | 416/220 R |
| 5,240,375 A * | 8/1993 | Wayte | ...................... | F01D 5/28 |
| | | | | 416/219 R |
| 5,439,353 A * | 8/1995 | Cook | ..................... | B29C 70/86 |
| | | | | 416/229 R |
| 5,791,877 A * | 8/1998 | Stenneler | .............. | F01D 5/3092 |
| | | | | 416/221 |
| 6,004,101 A * | 12/1999 | Schilling | ................... | F01D 5/28 |
| | | | | 416/219 R |
| 6,132,175 A * | 10/2000 | Cai | ......................... | F01D 5/284 |
| | | | | 403/29 |
| 6,832,896 B1 * | 12/2004 | Goga | .................... | F01D 5/3007 |
| | | | | 416/191 |
| 6,860,722 B2 * | 3/2005 | Forrester | ............... | F01D 5/3092 |
| | | | | 416/193 A |
| 8,231,354 B2 * | 7/2012 | Campbell | ............... | B23P 15/04 |
| | | | | 416/193 A |
| 8,459,954 B2 | 6/2013 | Anderson et al. | | |
| 8,961,141 B2 | 2/2015 | Anderson et al. | | |
| 9,228,445 B2 * | 1/2016 | Darkins, Jr. | ............ | F01D 5/147 |
| 9,366,145 B2 | 6/2016 | Tomeo et al. | | |
| 9,376,926 B2 | 6/2016 | Anderson et al. | | |
| 9,500,083 B2 * | 11/2016 | Cairo | .................... | C04B 35/117 |
| 10,060,277 B2 * | 8/2018 | Engel | ..................... | F01D 5/284 |
| 2011/0129600 A1 * | 6/2011 | Das | ......................... | C23C 24/04 |
| | | | | 427/201 |

FOREIGN PATENT DOCUMENTS

| | | |
|---|---|---|
| EP | 2374999 A2 | 10/2011 |
| EP | 2977552 A1 | 1/2016 |
| GB | 2262966 A | 7/1993 |

* cited by examiner

MULTI-PIECE NON-LINEAR AIRFOIL

BACKGROUND

This disclosure relates to gas turbine engines, and more particularly to fan blades for use in gas turbine engines.

A gas turbine engine, such as a turbofan engine for an aircraft, includes a fan section, a compression section, a combustion section and a turbine section. An axis of the engine is centrally disposed within the engine and extends longitudinally through the sections. The primary flow path for working medium gases extends axially through the sections of the engine. A secondary flow path for working medium gases extends parallel to and radially outward of the primary flow path.

The fan section includes a rotor assembly and a stator assembly. The rotor assembly of the fan includes a rotor disc and plurality of radially extending fan blades. The fan blades extend through the flow path and interact with the working medium gases and transfer energy between the fan blades and working medium gases. The stator assembly includes a fan case, which circumscribes the rotor assembly in close proximity to the tips of the fan blades.

During operation, the fan draws the working medium gases, more particularly air, into the engine. The fan raises the pressure of the air drawn along the secondary flow path, thus producing useful thrust. The air drawn along the primary flow path into the compressor section is compressed. The compressed air is channeled to the combustion section where fuel is added to the compressed air and the air/fuel mixture is burned. The products of combustion are discharged to the turbine section. The turbine section extracts work from these products to power the fan and compressed air. Any energy from the products of combustion not needed to drive the fan and compressor contributes to useful thrust.

Typical fan blades on gas turbine engines are made up of two design features, the airfoil and the root. The airfoil does all of the aero-mechanical work to produce thrust and compression. The root is contains the necessary attachment features to hold the airfoil in place. Some roots use either a pin or dovetail construction to attach to the rotor. The airfoil may be a highly contoured surface with complex splines that end at the root. In metallic structures it is easier to manufacture these transition shapes, but in composites these contours may lead to misaligned fibers, and ply drops which are poor for strength and durability.

Accordingly it is desirable to provide an improved fan blade with a composite airfoil.

BRIEF DESCRIPTION

In one embodiment, a fan blade assembly for a gas turbine engine is provided. The fan blade assembly having: a non-linear composite airfoil; and a metal root removably attached to the non-linear composite airfoil.

In addition to one or more of the features described above, or as an alternative to any of the foregoing embodiments, the non-linear composite airfoil may have a first root portion and the metal root may have a slot for slidably receiving the first root portion therein.

In addition to one or more of the features described above, or as an alternative to any of the foregoing embodiments, further embodiments may include a locking mechanism for removably securing the first root portion to the slot.

In addition to one or more of the features described above, or as an alternative to any of the foregoing embodiments, the non-linear composite airfoil may be formed from graphite and the metal root may be formed from titanium and the first root portion may have a dovetail configuration.

In addition to one or more of the features described above, or as an alternative to any of the foregoing embodiments, the non-linear composite airfoil may be formed from graphite and the metal root is formed from titanium.

In addition to one or more of the features described above, or as an alternative to any of the foregoing embodiments, the metal root may have a dovetail configuration.

In addition to one or more of the features described above, or as an alternative to any of the foregoing embodiments, the non-linear composite airfoil may be removably secured to the metal root via a locking mechanism.

In another embodiment, a rotor for a gas turbine engine is provided. The rotor having: a plurality of fan blade assemblies each being removably to the rotor, wherein each fan blade assembly has: a non-linear composite airfoil; and a metal root removably attached to the non-linear composite airfoil, wherein the metal root is removably secured to a complimentary slot located in a surface of the rotor.

In addition to one or more of the features described above, or as an alternative to any of the foregoing embodiments, the non-linear composite airfoil may have a first root portion and the metal root may have a slot for slidably receiving the first root portion therein.

In addition to one or more of the features described above, or as an alternative to any of the foregoing embodiments, further embodiments may include a locking mechanism for removably securing the first root portion to the slot.

In addition to one or more of the features described above, or as an alternative to any of the foregoing embodiments, the non-linear composite airfoil may be formed from graphite and the metal root may be formed from titanium and wherein the first root portion may have a dovetail configuration.

In addition to one or more of the features described above, or as an alternative to any of the foregoing embodiments, the non-linear composite airfoil may be formed from graphite and the metal root may be formed from titanium.

In addition to one or more of the features described above, or as an alternative to any of the foregoing embodiments, the non-linear composite airfoil may be removably secured to the metal root via a locking mechanism and wherein the non-linear composite airfoil may be formed from graphite and the metal root may be formed from titanium.

In addition to one or more of the features described above, or as an alternative to any of the foregoing embodiments, further embodiments may include: a first locking mechanism and a second locking mechanism for removably securing the non-linear composite airfoil to the metal root and the metal root to the rotor, wherein the first locking mechanism may be located at a first end of the rotor and the second locking mechanism may be located at a second opposite end of the rotor and wherein the non-linear composite airfoil may be formed from graphite and the metal root may be formed from titanium.

In addition to one or more of the features described above, or as an alternative to any of the foregoing embodiments, the metal root may have a dovetail configuration.

In yet another embodiment, a gas turbine engine is provided. The gas turbine engine having: a fan section, including: a plurality of fan blade assemblies each being removably to a rotor of the fan section, wherein each fan blade assembly has: a non-linear composite airfoil; and a metal root removably attached to the non-linear composite airfoil, wherein the metal root is removably secured to a complimentary slot located in a surface of the rotor; a compressor section; a combustor section; and a turbine section.

In addition to one or more of the features described above, or as an alternative to any of the foregoing embodiments, the non-linear composite airfoil may have a first root portion and the metal root may have a slot for slidably receiving the first root portion therein.

In addition to one or more of the features described above, or as an alternative to any of the foregoing embodiments, further embodiments may include a first locking mechanism and a second locking mechanism for removably securing the first root portion to the slot and the metal root to the rotor, wherein the first locking mechanism is located at a first end of the rotor and the second locking mechanism is located at a second opposite end of the rotor.

In addition to one or more of the features described above, or as an alternative to any of the foregoing embodiments, the first locking mechanism may be a locking ring configured to engage a plurality of locking hooks located at the first end of the rotor and the second locking mechanism may be a locking ring configured to engage a plurality of locking hooks located at the second end of the rotor.

In addition to one or more of the features described above, or as an alternative to any of the foregoing embodiments, the metal root may have a dovetail configuration and the non-linear composite airfoil is formed from graphite and the metal root is formed from titanium.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
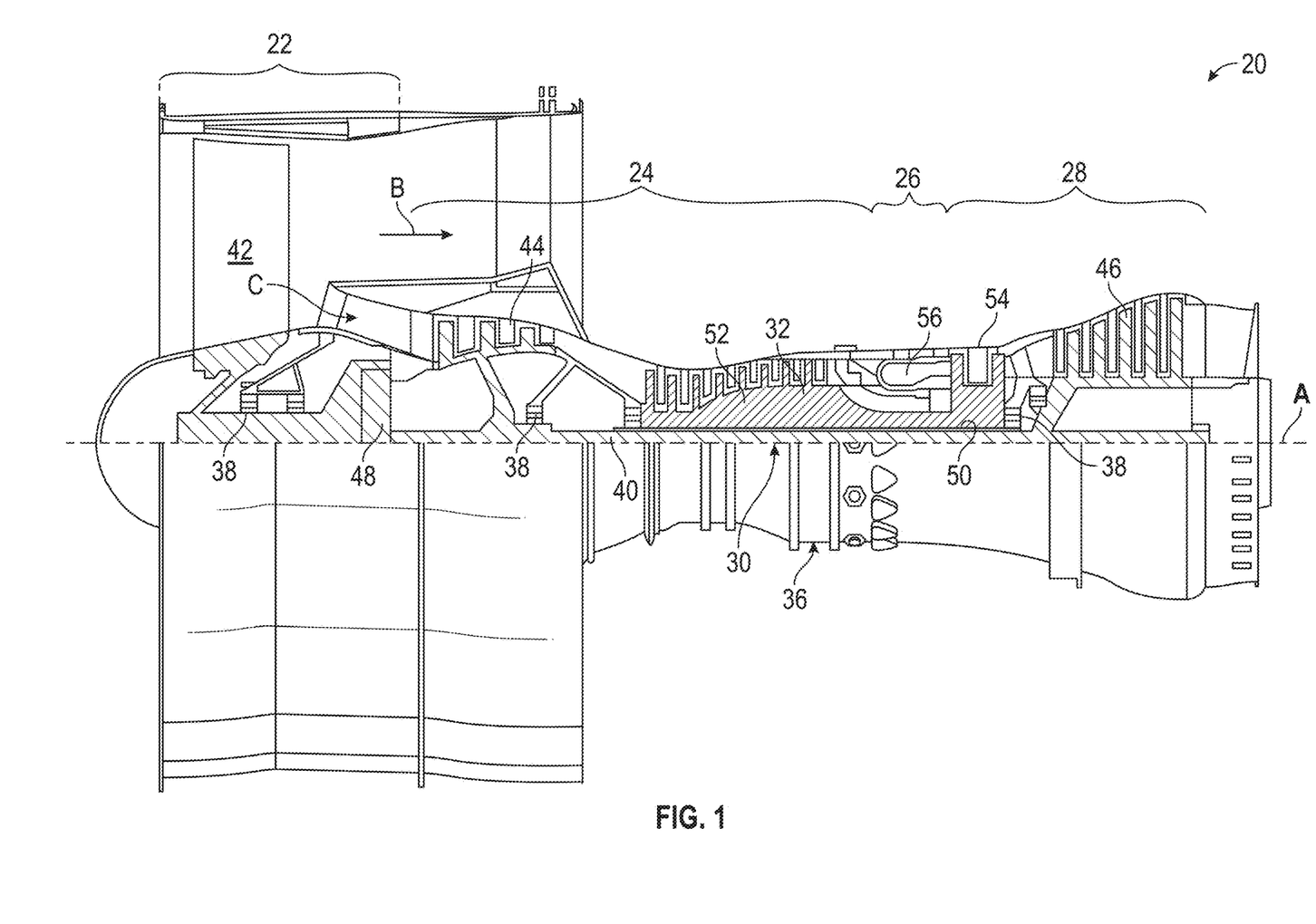
FIG. 1 is a schematic partial cross-sectional view of a gas turbine engine in accordance with a non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

In a turbofan engine, lighter components generally lead to more efficient performance. If less energy is expended moving internal engine parts, more energy is available for useful work. At the same time, the components themselves must be strong enough to withstand forces typical for the operating environment and performance envelope. Safety considerations based on the frequency and/or severity of possible failure will often dictate that the engine components also be able to withstand certain atypical, yet foreseeable events as well. Because stronger components are often heavier and/or more expensive, a balance must be struck between efficiency, safety, and cost.

Figure 2:
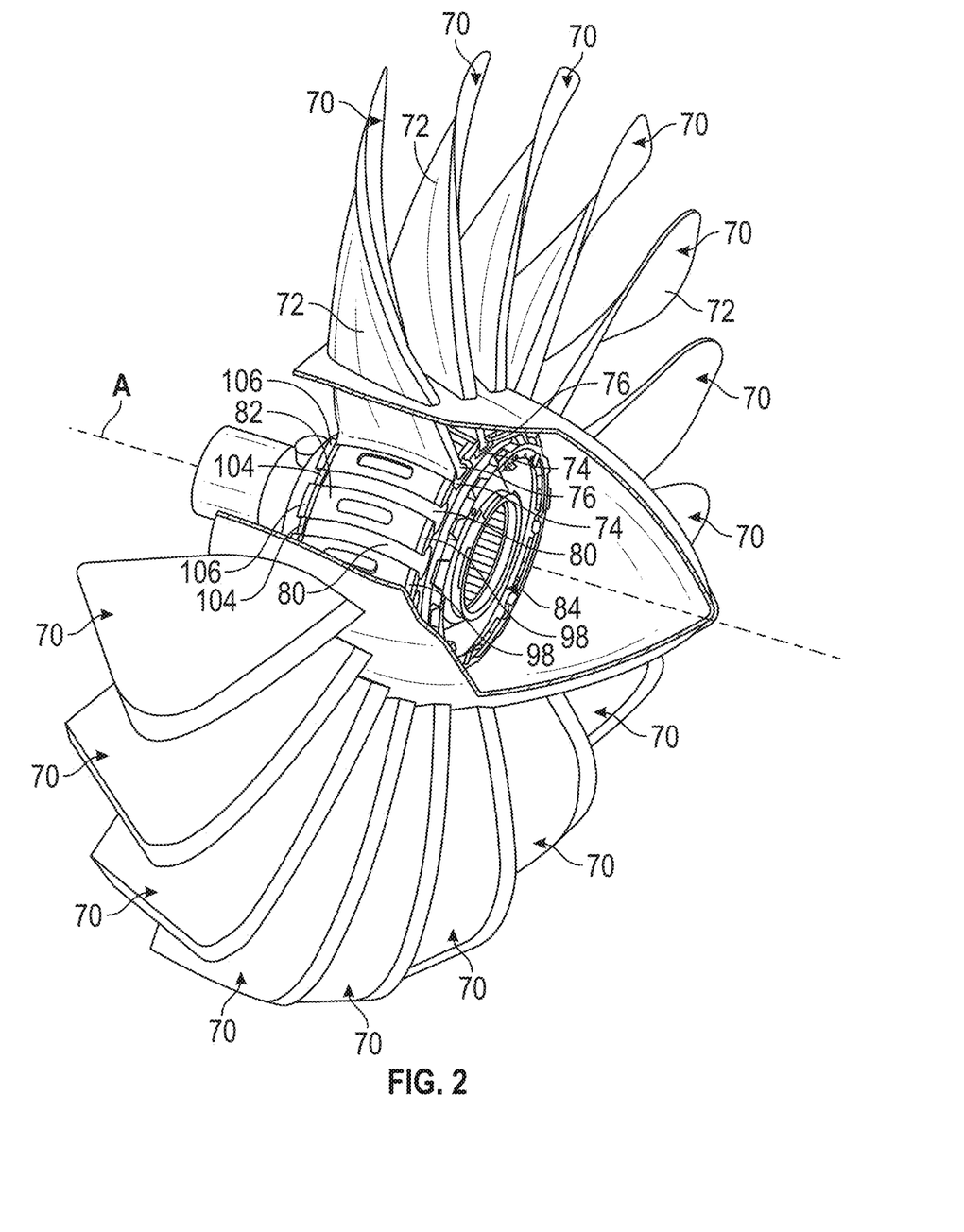
FIG. 2 is an enlarged perspective partial sectional view of a fan section of a gas turbine engine in accordance with a non-limiting embodiment.
Figure 3:
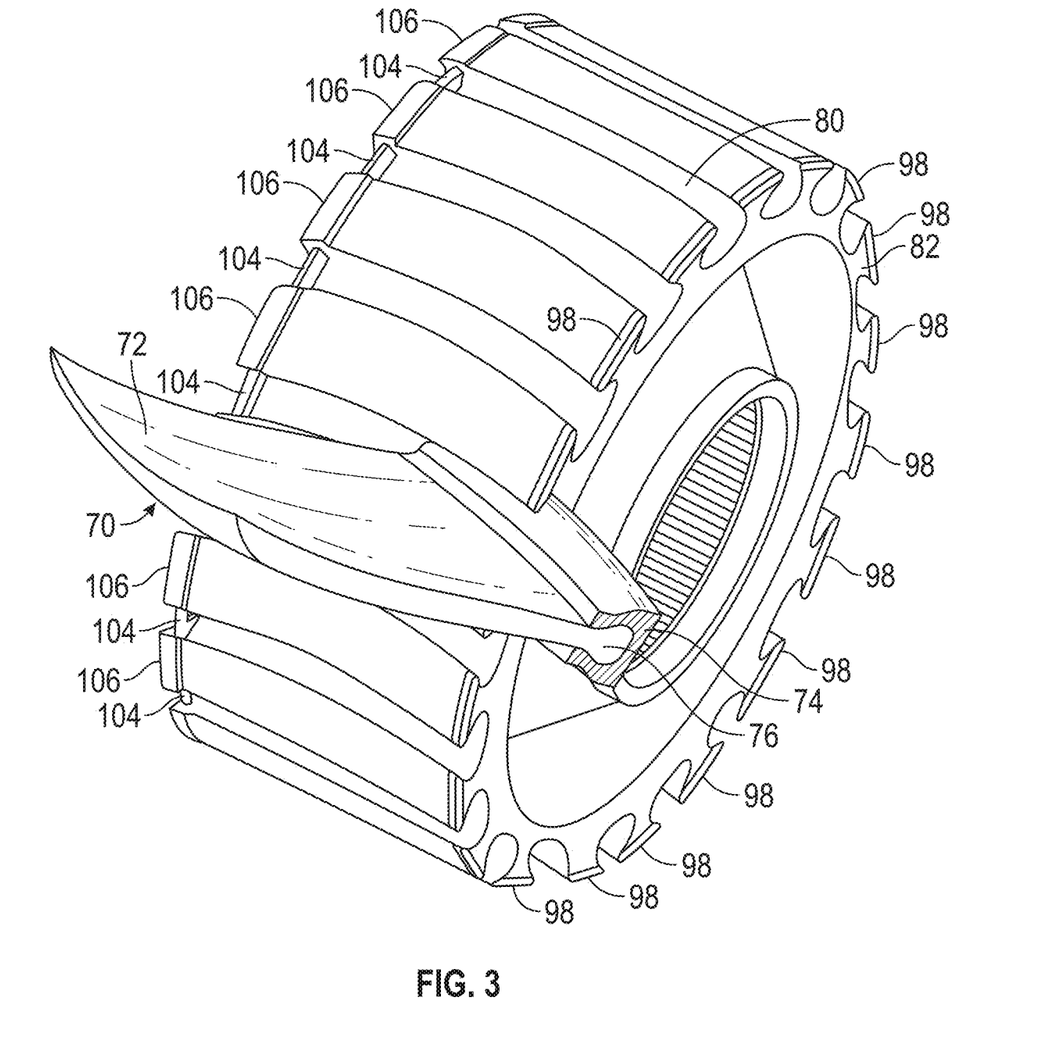
FIG. 3 is a perspective view of a rotor and blade assembly in accordance with a non-limiting embodiment.
Figure 4:
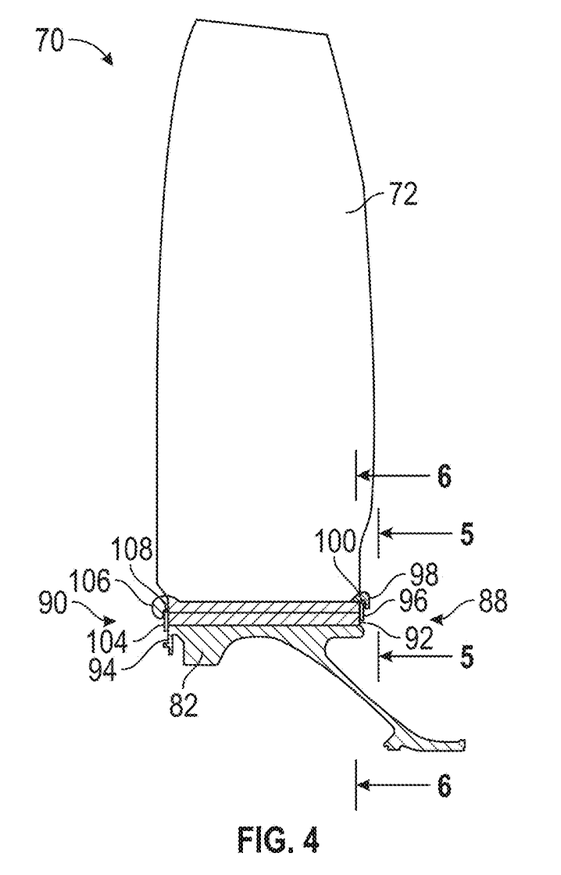
FIG. 4 is a side view of a blade assembly secured to a rotor of a fan section of a gas turbine engine in accordance with a non-limiting embodiment.
Figure 5:
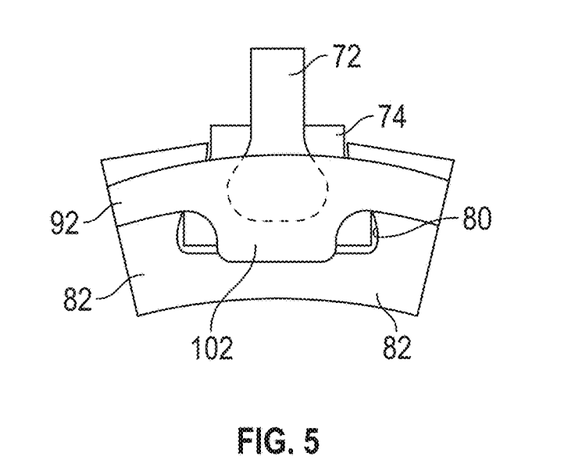
FIG. 5 is a view along lines 5-5 of FIG. 4.
Figure 6:
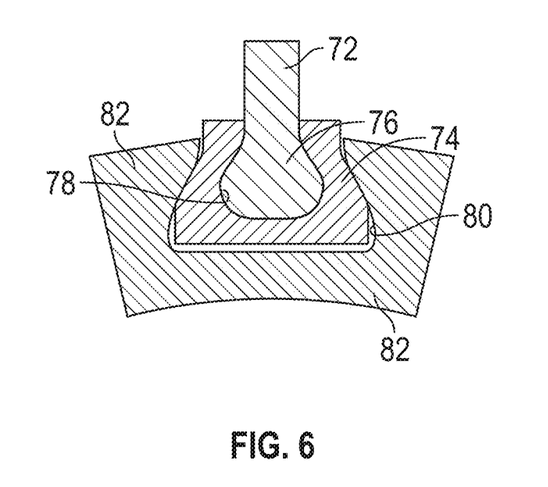
FIG. 6 is cross-sectional view along lines 6-6 of FIG. 5.

With reference to FIGS. 2-4, the fan 42 includes a plurality of circumferentially spaced fan blades or blade assemblies 70. Each fan blade or blade assembly 70 has an airfoil portion 72 and separate root portion 74. In one embodiment, the airfoil portion 72 may be a non-linear composite airfoil 72. In addition and in one embodiment the airfoil portion or non-linear composite airfoil 72 and the separate root portion 74 are each manufactured separately using independent and different manufacturing processes. In one embodiment the airfoil portion or non-linear composite airfoil 72 is manufactured out of a different material than the separate root portion 74. Furthermore, the separate root portion 74 is removably secured to the airfoil portion or non-linear composite airfoil 72 in a separate step which allows the airfoil portion or non-linear composite airfoil 72 and the separate root portion 74 to be manufactured out of discrete materials having different characteristics and material properties. For example and in one embodiment the airfoil portion or non-linear composite airfoil 72 may be manufactured from a composite material such as graphite, carbon graphite, ceramic materials and/or equivalents thereof or combinations thereof while the separate root portion 74 may be manufactured from metal such as titanium or a titanium alloy and equivalents thereof. Thus, the separate root portion 74 may also be referred to as a metal root portion 74.

This allows the composite airfoil to be married or mechanically attached in a removable fashion to a metallic root which has different material properties than the airfoil. For example, this allows for the laminate of the composite airfoil to be simplified, which will address the deleterious effects of the required contours for a composite airfoil with an integral root that is directly secured to the fan rotor hub.

In one embodiment, the airfoil portion or non-linear composite airfoil 72 includes an innermost root portion or first root portion 76. The first root portion 76 may define an attachment such as an inverted fir-tree, bulb, or dovetail so that the airfoil portion or non-linear composite airfoil 72 is slidably received in a complimentary configured blade slot or first slot 78 in the separate root portion, metal root or second root portion 74. See for example FIG. 4. As used herein, the first root portion 76 refers to an integral root portion of the airfoil portion or non-linear composite airfoil 72 that is integrally formed with the airfoil portion or non-linear composite airfoil 72 and is mechanically and removably secured to the separate root portion, metal root or second root portion 74.

The separate root portion or second root portion 74 is also mechanically and removably secured to a complimentary slot or second slot 80 of a fan rotor hub 82 to provide a bladed rotor 84 about axis A. In one embodiment, the separate root portion or second root portion 74 may define an attachment such as an inverted fir-tree, bulb, or dovetail as illustrated in at least FIG. 4. As used herein, the dovetail configuration of the first root portion 76 and the second root portion 74 may in one non-limiting embodiment refer to the configurations illustrated in at least FIG. 4.

The illustrated slots, when viewed radially toward the axis A of FIG. 2, may have a curved profile. Alternatively, the slots may be linear slots having a linear centerline oriented parallel or oblique to the rotational axis. In addition and in one embodiment, the slots 78 and 80 may be both curved or both linear or alternatively, one of the slots may be curved while the other is linear. For example, slot 78 and root 76 may be curved while slot 80 and root 74 are linear in the axial direction and vice versa. As defined herein, the term "axial" refers not only to a direction strictly parallel to the rotational axis but also to directions somewhat non-parallel to the axis, such as the slotwise direction defined by a curved or linear slot.

In order to mechanically and removably secure the integral first root portion 76 to the first slot 78 after it is slid into place in the separate root portion or second root portion 74 as well as removably and mechanically secure the separate root portion or a second root portion 74 to the slot or second slot 80 after it is slid into the slot 80 of the fan rotor hub 82, a locking mechanism or first locking mechanism 88 is used to lock or secure the first root portion 76 to the separate root portion or a second root portion 74 as well as secure the separate root portion or a second root portion 74 to the rotor hub. In one embodiment, the first locking mechanism is proximate to a first end or forward end 92 of the fan 42.

In addition, a locking mechanism or second locking mechanism 90 is also used to removably and mechanically secure the first root portion 76 to the separate root portion or second root portion 74 as well as removably and mechanically secure the separate root portion or second root portion 74 to the slot or second slot 80 after it is slid into the slot 80 of the fan rotor hub 82. The second locking mechanism 90 being proximate to a second or aft end 94 of the fan 42. The first end 92 being opposite to the second end 94.

It being understood that the integral first root portion 76 may be secured to the first slot 78 before the securement of the second root portion 74 to the second slot 80 or alternatively, the integral first root portion 76 may be secured to the first slot 78 after the securement of the second root portion 74 to the second slot 80. It is also understood that the first locking mechanism 88 and the second locking mechanism 90 may be secured to the rotor hub 82 in any order after the second root portion 74 is slid into slot 80 along with the first root portion 76.

In one non-limiting embodiment, the first locking mechanism 88 is a locking ring 96 that is configured to engage a plurality of locking hooks 98 integrally formed with the rotor hub 82. The locking hooks 98 form locking slots 100 for receipt of locking ring 96 therein. In one embodiment, the locking ring 96 has an enlarged portion 102 configured to cover end portions of both the first root portion 76 and the second root portion 74 when they are inserted in their respective slots. In addition, the second locking mechanism 90 may also be a locking ring 104 that is configured to engage a plurality of locking hooks 106 integrally formed with the rotor hub 82 on an opposite side. The locking hooks 106 form locking slots 108 for receipt of locking ring 104 therein. Similar to locking ring 96, the locking ring 104 has an enlarged portion configured to cover end portions of both the first root portion 76 and the second root portion 74 when they are inserted in their respective slots.

In one embodiment, the locking rings 96, 104 may comprise a plurality of segments necessary to lock and retain each of the root segments into the hub 82. Alternatively, a single locking ring can be used. Although, the locking mechanisms 88, 90 are illustrated as locking rings various embodiments of the present disclosure contemplate numerous other locking mechanisms. For example and in one non-limiting embodiment, any fan blade lock assembly as illustrated in any of the following U.S. Pat. Nos. 9,376,926; 9,366,145; 8,961,141; and 8,459,954 may be employed.

In one embodiment, the first locking mechanism 88 and the second locking mechanism 90 may be similar in configuration. Alternatively, the first locking mechanism 88 and the second locking mechanism 90 may have different configurations.

Various embodiments of the present disclosure allow the entire blade assembly 70 to be removed from the hub 82. Thereafter and as necessary, only the second root portion 74 with a replacement airfoil 72 or the airfoil 72 with a replacement second root portion 74 is replaced into the hub 82. Alternatively, the entire blade assembly 70 is replaced with another airfoil 72 and another replacement second root portion 74.

It should be understood that although a single fan stage is illustrated and described in the disclosed embodiment, additional stages as well as other bladed rotor with other blades that are received with an axial interface inclusive of fan blades, compressor blades and turbine blades may benefit from various embodiments of the present disclosure.

The following U.S. Pat. Nos. 9,376,926; 9,366,145; 8,961,141; and 8,459,954 are incorporated herein in their entirety by reference thereto.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences may be shown, described, and claimed, it should be understood that steps may be performed in any order, separated or combined unless otherwise indicated and will still benefit from the present disclosure.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A fan blade assembly for a gas turbine engine, comprising:
   a composite airfoil, the composite airfoil having a first root portion, the first root portion having a dovetail configuration extending from a base of the composite airfoil, the base being located between the first root portion and an airfoil portion of the composite airfoil;
   a metal root having a slot configured to slidably receive the first root portion such that the metal root is removably attached to the first root portion of the composite airfoil and wherein the metal root extends along opposite sides of the base of the composite airfoil to a region of the base that is radially outward of a fan hub of the fan blade assembly when the metal root is secured to the first root portion; and
   a first locking mechanism and a second locking mechanism for removably securing the first root portion to the slot and the metal root to the fan hub, the first locking mechanism being located at a first end of the fan hub and the second locking mechanism being located at a second opposite end of the fan hub, and wherein the first locking mechanism is a locking ring configured to engage a plurality of locking hooks located at the first end of the fan hub and the second locking mechanism is a locking ring configured to engage a plurality of locking hooks located at the second end of the fan hub.

2. The fan blade assembly as in claim 1, wherein the composite airfoil is formed from graphite and the metal root is formed from titanium.

3. A rotor for a gas turbine engine, comprising:
   a plurality of fan blade assemblies each being removably to the rotor, wherein each fan blade assembly comprises:
      a composite airfoil, the composite airfoil having a first root portion, the first root portion having a dovetail configuration extending from a base of the composite airfoil, the base being located between the first root portion and an airfoil portion of the composite airfoil; and
      a metal root removably attached to the composite airfoil, the metal root being having a slot configured to slidably receive the first root portion such that the metal root is removably attached to the first root portion of the composite airfoil and wherein the metal root extends along opposite sides of the base of the composite airfoil to a region of the base that is radially outward of the rotor when the metal root is secured to the first root portion;

wherein the metal root is removably secured to a complimentary slot located in a surface of the rotor; and a first locking mechanism and a second locking mechanism for removably securing the first root portion to the slot and the metal root to the rotor, the first locking mechanism being located at a first end of the rotor and the second locking mechanism being located at a second opposite end of the rotor, and wherein the first locking mechanism is a locking ring configured to engage a plurality of locking hooks located at the first end of the rotor and the second locking mechanism is a locking ring configured to engage a plurality of locking hooks located at the second end of the rotor.

4. The rotor as in claim 3, wherein the composite airfoil is formed from graphite and the metal root is formed from titanium.

5. A gas turbine engine, comprising:

a fan section, comprising:

a plurality of fan blade assemblies each being removably to a rotor of the fan section, wherein each fan blade assembly comprises:

a composite airfoil, the composite airfoil having a first root portion, the first root portion having a dovetail configuration extending from a base of the composite airfoil, the base being located between the first root portion and an airfoil portion of the composite airfoil; and a metal root removably attached to the composite airfoil, the metal root having a slot configured to slidably receive the first root portion such that the metal root is removably attached to the first root portion of the composite airfoil and wherein the metal root extends along opposite sides of the base of the composite airfoil to a region of the base that is radially outward of the rotor when the metal root is secured to the first root portion; and wherein the metal root is removably secured to a complimentary slot located in a surface of the rotor;

a first locking mechanism and a second locking mechanism for removably securing the first root portion to the slot and the metal root to the rotor, the first locking mechanism being located at a first end of the rotor and the second locking mechanism being located at a second opposite end of the rotor, and wherein the first locking mechanism is a locking ring configured to engage a plurality of locking hooks located at the first end of the rotor and the second locking mechanism is a locking ring configured to engage a plurality of locking hooks located at the second end of the rotor;

a compressor section;

a combustor section; and a turbine section.

6. The gas turbine engine as in claim 5, wherein the composite airfoil is formed from graphite and the metal root is formed from titanium.

* * * * *